(12) United States Patent
Wilcox et al.

(10) Patent No.: US 6,404,856 B1
(45) Date of Patent: *Jun. 11, 2002

(54) SYSTEM FOR RECORDING, ANNOTATING AND INDEXING AUDIO DATA

(75) Inventors: Lynn R. Wilcox, Portola Valley; Patrick R. Chiu, Menlo Park, both of CA (US); Jacek Gwizdka, Toronto (CA)

(73) Assignees: Fuji Xerox Co., Ltd., Tokyo (JP); Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,283

(22) Filed: Apr. 10, 1998

(51) Int. Cl.$^7$ .............................. H04M 1/64; G10L 3/00
(52) U.S. Cl. ................ 379/67.1; 379/88.01; 379/88.22; 704/270
(58) Field of Search .......................... 379/88.26, 88.27, 379/56.3–113, 172.5, 58–96, 88, 88.01, 67.1, 88.11, 100.05; 395/2.65, 2.45, 309; 704/240, 270; 340/8, 25, 44, 173; 364/513, 900; 370/352–466, 261; 455/550–556; 709/26; 707/100

(56) References Cited

U.S. PATENT DOCUMENTS

| | | | | |
|---|---|---|---|---|
| 5,390,236 A | * | 2/1995 | Klausner et al. | 379/88.11 |
| 5,526,407 A | * | 6/1996 | Russell et al. | 379/88.09 |
| 5,559,875 A | * | 9/1996 | Bieselin et al. | 379/88.09 |
| 5,651,055 A | * | 7/1997 | Argade | 379/88.01 |
| 5,655,058 A | | 8/1997 | Balasubramanian et al. | 395/2.65 |
| 5,687,221 A | * | 11/1997 | Oheda et al. | 379/93.17 |
| 5,717,879 A | | 2/1998 | Moran et al. | 345/716 |
| 5,835,577 A | * | 11/1998 | Disanto et al. | 379/93.19 |
| 5,970,455 A | * | 10/1999 | Wilcox et al. | 704/270 |
| 6,034,970 A | * | 3/2000 | Levac et al. | 370/466 |

FOREIGN PATENT DOCUMENTS

| | | | | |
|---|---|---|---|---|
| EP | 0510 411 A2 | 10/1992 | | H04M/3/42 |
| EP | 0 679 005 A1 | 10/1995 | | H04M/3/50 |
| EP | 0 866 397 A1 | 9/1998 | | G06F/3/033 |
| WO | WO 93/07562 | 4/1993 | | G06F/3/16 |

OTHER PUBLICATIONS

Lu, "A small Revelation: Newton has arrived—at long last", Sep. 1993, Macworld, pp. 102–106 with an Apple advertisement for the Newton MessagePad from the same magazine, p. 29.*

Hindus, et al., *Capturing, Structuring, and Representing Ubiquitous Audio*, ACM Transactoins on Information Systems, vol. 11, No. 4, Oct. 1993, pp. 376–400.

Apple Computer, Inc. *Using the Notepad*, Chapter 2, pp. 43–45, and *Managing the MessagePad 2002*, The Apple Newton®, Apple Computer, Inc., Chapter 5, pp. 116–122.

* cited by examiner

*Primary Examiner*—Fan Tsang
*Assistant Examiner*—Ovidio Escalante
(74) *Attorney, Agent, or Firm*—Oliff & Berridge, PLC

(57) ABSTRACT

An audio data system assigns properties to audio data and keywords to audio data files. The properties indicate the type of audio data and the keywords indicate the general content of an audio data file. The system provides an updatable database of audio data that is capable of being searched based on the properties and the keywords.

20 Claims, 4 Drawing Sheets

FIG. 4

- APPOINTMENT
- QUOTATION
- NAME
- ☑ TO DO ITEM
- PHONE
- URL

WIRELESS

SELECT

SUMMARY

FIG. 5

| CREATED | | MODIFIED | | KEYWORDS |
|---|---|---|---|---|
| 09/12/96 | 11:10:31 | 09/12/96 | 11:10:31 | WIRELESS |
| 09/12/96 | 11:08:06 | 09/12/96 | 11:08:06 | AUDIO |
| 09/12/96 | 11:06:15 | 09/12/96 | 11:06:15 | VIDEO |

SYSTEM FOR RECORDING, ANNOTATING AND INDEXING AUDIO DATA

BACKGROUND OF THE INVENTION

1. Field of Invention

This invention is directed to a system for recording, annotating and indexing audio data. In particular, the invention is directed to an audio system that improves the way users record, review and retrieve audio data.

2. Description of Related Art

Many people take notes on their telephone conversations. Interviews with lawyers, managers, administrative assistants, salesmen and executives have shown that certain note-taking practices are used during phone calls. Some people record the date and time of the call, as well as the identity of the caller, some people keep a separate notebook by the phone for notes on their calls and others keep a special notebook for notes taken on voice mail messages. People take notes on information obtained during their calls, generate a list of "to do" items, and record other details such as sales orders and directions. If an administrative assistant answers a call for his boss and finds the message too complex, the call is transferred to the voice mail recording system.

Recording a call increases the accuracy of the information that is obtained from the call. However, while voice mail systems can record phone conversations, they do not index the audio data for later access.

U.S. patent application Ser. No. 08/821,311, filed Mar. 20, 1997, which is incorporated herein in its entirety, discloses a system that allows users to simultaneously record audio data while taking hand-written notes. The '311 application discloses an electronic notebook that improves the way users record, review, retrieve and reuse their personal notes. The electronic notebook includes an interface that is similar to a standard paper notebook. That is, the user enters freeform hand-written notes onto a screen having the appearance of a page into a digital notebook. The electronic notebook also has features that augment standard note-taking capabilities. The electronic notebook allows a property, such as "action item" or "name" to be associated with the note marks so that notes with these properties may be more easily retrieved. In order to further aid indexing, the electronic notebook allows the user to assign text keywords to a page of notes. Finally, the electronic notebook records the audio data and synchronizes the audio data with the note marks. However, only those portions of the audio data that is highlighted by the user are permanently stored.

These features of the electronic notebook provide the ability to have multiple views on a notebook. These multiple view are analogous to views available in a database system. For example, requesting notes from last week with the property "action item" and keywords "mobile" and "computing" causes the notebook to display only those note marks from a previous week which were marked as action items and which were on the topic of mobile computing. Once a notebook's views are defined they may be reused. This provides the user with dynamic organization of the changing content of the notebook.

The note marks are linked to the audio data, so that the user can play the audio data that was recorded at the time a particular note was written. Audio data is displayed with an audio timeline at the top of the note page. Important audio data can be highlighted. Audio data highlights are shown as colored bands in the audio display that can be selected for playback. Note marks can be indexed using ink properties. Ink properties are data types that are associated with particular types of ink marks. The ink properties are indicated to the user by ink color and/or mark size. In addition, pages or note marks can be indexed by keywords. Note marks can be retrieved by queries using properties and keywords. Property queries retrieve only those note marks having the specified property, while keyword queries retrieve an entire page of note marks. The electronic notebook disclosed in the '311 application, however, does allow access to the audio data without referring to the associated note marks.

"Capturing, Structuring and Representing Ubiquitous Audio", by D. Hindus et al., ACM Trans. Information Systems, Vol. II, No. 4, Oct. 1993, pp. 376–400, discloses a system that records telephone calls while displaying the turn-taking structure of the conversation. During the telephone call, the user selects parts of the conversation to save. After the call, the user can add text tags to the stored parts of the conversation. However, this system does not permit the user to enter pen-based input. This system only permits typed input and then only after the telephone call.

The Apple Newton® places phone calls, and provides a note page to take notes on the conversation. However, the conversation is not recorded. The Apple Newton® also records messages and sounds but does not associate properties, text or ink to the recording.

SUMMARY OF THE INVENTION

This invention provides a method and apparatus that uses keywords and properties to index audio data.

This invention further provides a method and apparatus that separates the sides of a conversation in the audio data to improve access.

This invention additionally provides a method and apparatus for recording, indexing and retrieving voice mail messages.

In particular, the method and apparatus of this invention, applies properties to the audio data and generates indexes to the audio data. This indexing allows retrieval of specific audio data and portions of audio data.

This invention allows users to take notes using a computer while recording the audio data of a telephone call. The two sides of the conversation are separated and shown in an audio display for easy access to specific comments using the associated audio data attributes, such as date and time, properties, keywords, and identity of the caller. These associated attributes are used to index the audio data for subsequent retrieval. Properties apply to the audio data as well as to note marks to provide access to specific remarks in the audio data.

This invention allows a user to play specific comments from previous calls during a current conversation. This is useful when the tone of voice used in a call conveys information that is not available in the associated note marks or text.

Properties for the audio data can be set without selecting or writing note marks by, for example, pressing a button for the desired property. The property of the audio data is displayed to the user by coloring the band for the current speaker turn in the audio bar. The method and apparatus of this invention assume that the extent of each speaker's turn corresponds to the extent of the selected audio data property.

The method and apparatus of this invention route calls based upon a mode. Depending on the mode, the method and apparatus of this invention send calls to an answering machine, accept a call for conversation, or tentatively accept a call based on the identity of the caller.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 4 illustrates a sample retrieval query window of the audio data system according to this invention; and FIG. 5 illustrates a sample table of contents of retrieved audio data files according to this invention.

These and other features and advantages of this invention are described in or are apparent from the following detailed description of the preferred embodiments.

DETAILED DESCRIPTION OF PREFERRED EMBODIMENTS

Figure 1:
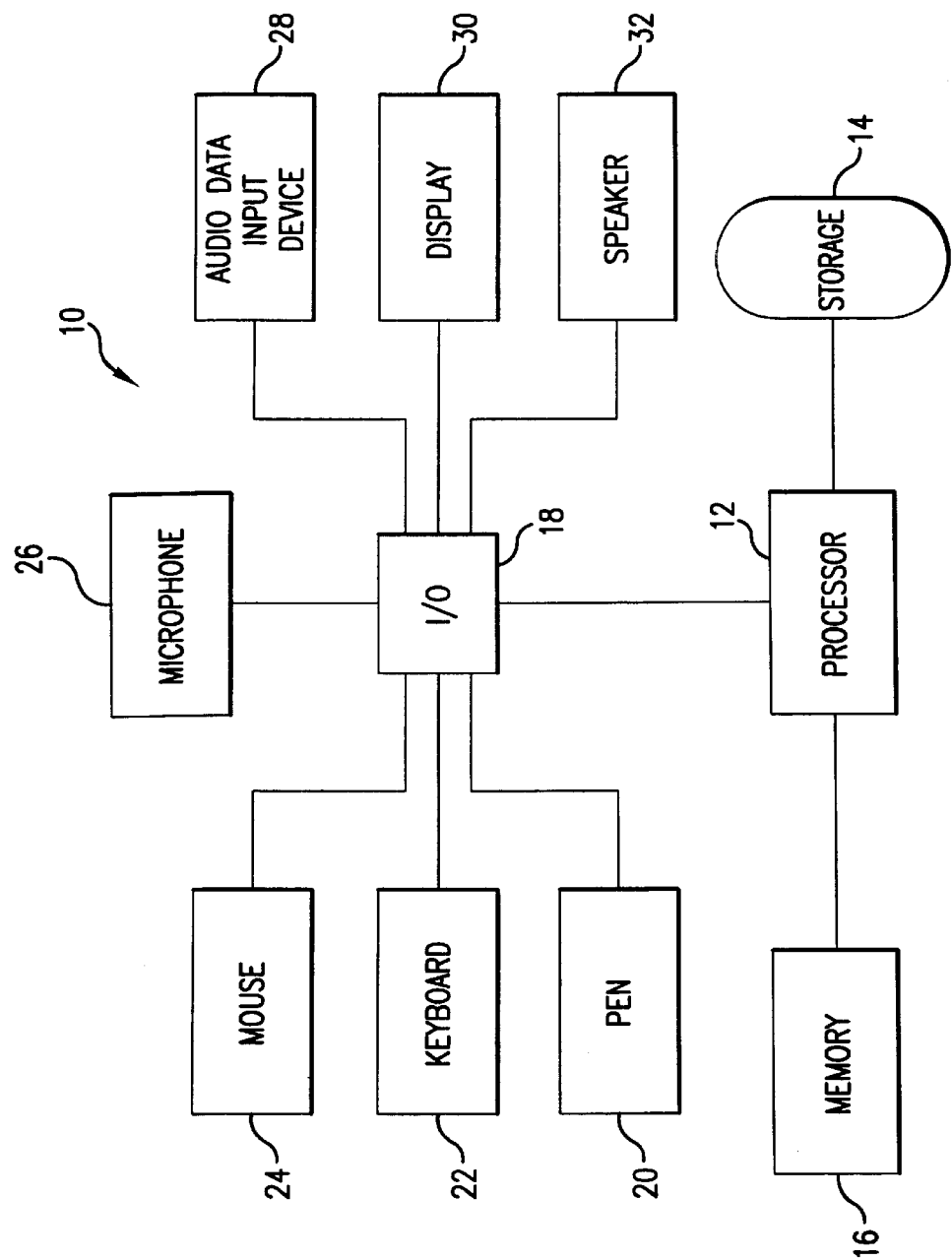
FIG. 1 is a block diagram of one embodiment of an audio data system according to this invention.

FIG. 1 is a block diagram of one embodiment of an audio data system 10 according to this invention. The audio data system 10 has a processor 12 communicating with a storage device 14, a memory 16 and an input/output interface 18. A user interacts with and controls the audio data system 10 through any number of conventional input/output devices, such as a pen 20, a keyboard 22, a mouse 24, a microphone 26, an audio data input device 28, a display 30 and a speaker 32. The input/output devices 20–32 communicate with the input/output interface 18 that, in turn, communicates with the processor 12.

The audio data system 10 is preferably implemented on a programmed general purpose computer. However, the system 10 can also be implemented using a specific purpose computer, a programmed microprocessor or microcontroller and any necessary peripheral integrated circuit elements, an ASIC or other integrated circuit, a hardwired electronic or logic circuit such as a discrete element circuit, a digital signal processor, a programmable logic device such as a PLD, PLA, FPGA, or PAL, or the like.

An alternate portion of the memory 16 is preferably implemented using static or dynamic RAM, and stores executing application programs and data. However, the alterable portion of the memory 16 can also be implemented using a floppy disk and drive disk, a writable optical disk and disk drive, a hard drive, flash memory or the like. A fixed portion of the memory 16 is preferably implemented using a ROM and stores basic control programs for the audio data system. However, the fixed portion of the memory can also be implemented using a PROM, an EPROM, an EEPROM, or a CD-ROM and disk drive or the like.

The storage device 14 is preferably implemented using a hard drive, and provides long-term storage for application programs and data. However, the storage device 14 can also be implemented using a floppy disk and disk drive, a writable optical disk and disk drive, flash memory, static or dynamic RAM, or the like.

The telephone system connector 28 may be any type of connector that is capable of carrying audio data. For example, the telephone system connector 28 can be a connection to a publicly or privately switched telephone network, a wired or wireless link to a data network. The data network can be a local area network, a wide area network, an intranet, the Internet or any other distributed processing and storage network.

Figure 2:
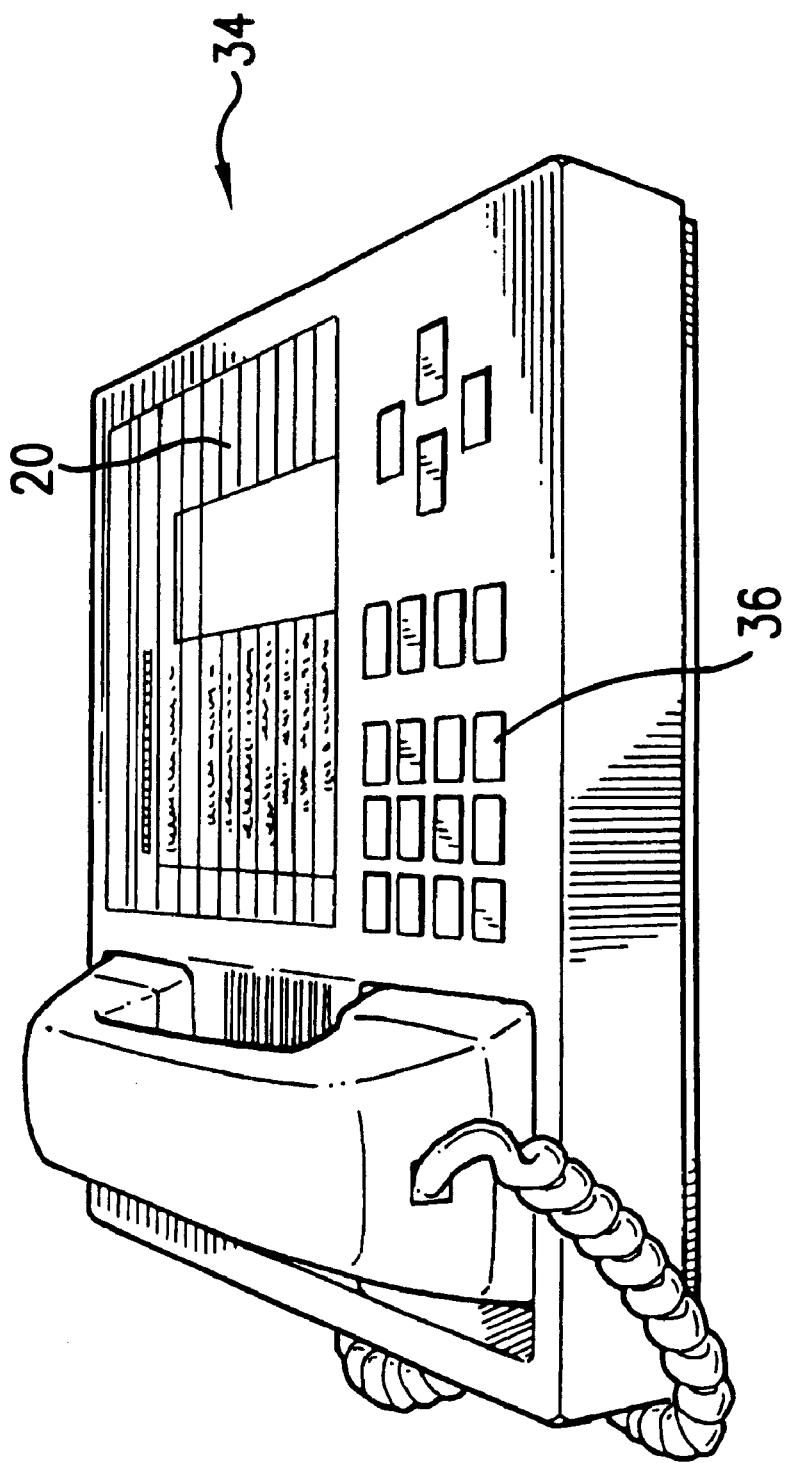
FIG. 2 shows one embodiment of the audio data system incorporated into a telephone set in accordance with this invention.

FIG. 2 shows one embodiment of the audio data system 10 of this invention that has been incorporated into a telephone 34. The audio data system 10 in FIG. 2 has an audio data input device 28 that is adapted to receive audio data from a telephone system and a handset and/or a microphone 26 that have been built into the telephone for hands free operation. This audio data system 10 also includes a keypad 36 and a pen-based input display 20 which are used as a user interface to control the operation of the audio data system 10.

The audio data system 10 of this invention allows a user to indicate the type of information contained in audio data by attaching properties to the audio data. Properties indicate information types that are associated with the selected audio data. Properties are associated with portions of the audio data, not the entire audio data file, so that individual portions of the audio data can be easily identified. Audio data portions having a specific property from a number of audio data files can be grouped and listed together. Properties are useful for retrieval because they are a low overhead categorization that can be used to distinguish between audio data portions.

The audio data system 10 of this invention records audio data and links the audio data to handwritten notes. The sides of the conversation in a telephone call are separated using a speaker segmentation algorithm. The resulting speaker segmentation is shown in the audio timeline bar 40 at the top of the note page 42 in FIG. 3. A local speaker is shown by the dark bands in the top bar 44 and another speaker is shown in the lower bar 46. Speaker segmentation and display can be extended to any number of sides of a conversation. If the audio data system 10 is connected to a conventional telephone system an elaborate speaker segmentation algorithm may be avoided by relying on the fact that each party will be using separate channels. All incoming audio can be attributed to a remote speaker and all outgoing audio can be attributed to a local speaker.

Audio data portions having different properties are distinguished from each other by the color of the timeline 44. For example, audio data portions that do not have any assigned properties are shown in black, while audio data portions having "action item" as an assigned property are shown in green.

The audio data system 10 allows properties to be applied to the audio data as well as to ink. Specific audio data can be selected and a property applied to that audio data. The property is indicated in the audio bar 40 by changing the color of the audio bar 40 to a color associated with that property. For example, the "to do" property may be indicated to the user in blue ink for the corresponding note marks and as a blue band in the audio bar 40 for the corresponding audio data.

Properties can be assigned to the audio data portions either before or after the audio data is recorded. If the user knows beforehand that the audio data about to be recorded has a certain property, the user can select that property from a menu, assign it to the audio data and begin recording. Properties may be assigned after recording by selecting the audio and assigning a property to the selected audio. For example, toggling one of the property buttons 50, a property corresponding to the property button is applied to the current turn in the conversation, indicating that this audio data portion has the given property. The property buttons 50 shown in the user interface 42 of FIG. 3 include a property button 52 which does not assign a property, a topic property button 54, a name property button 56, a quote property button 58, a phone property button 60, a to do property button 62, a Uniform Resource Locator (URL) property button 64, an organization property button 66 and a user defined property button. Properties can be assigned to audio data and note marks that are currently being received or which have been selected by toggling the property button 50 which corresponds to the desired property. The audio data system 10 may also indicate an audio data property, even though there are no associated note marks with that property.

While the extent of an ink property is defined by the note marks, the extent of an audio property is not automatically defined. However, since there is a natural segmentation of the audio according to the turn-taking in the conversation, turns can be used to define the extent of the audio property. Audio properties replace the notion of the audio highlighting used in previous systems, since a property such as "important" can be used instead. Further, the user does not have to specify the extent of the property.

In one embodiment of the audio data system 10 of this invention, the identity of a caller is used to index the audio data. This index can be obtained in several ways. The caller can be identified using a database linking a phone number or a caller id to the caller. If the caller is not calling from his own phone, the audio data system 10 of this invention uses a database of audio data files of known callers, and matches the voice from the incoming caller to an audio data file of a known caller. Any conventional speaker identification system may be used. One example of a speaker identification system is disclosed in U.S. Pat. No. 5,655,058, herein incorporated by reference in its entirety. The user can also enter the caller's identity through any other conventional input method. The audio data can also be indexed automatically according to date and time.

Figure 3:
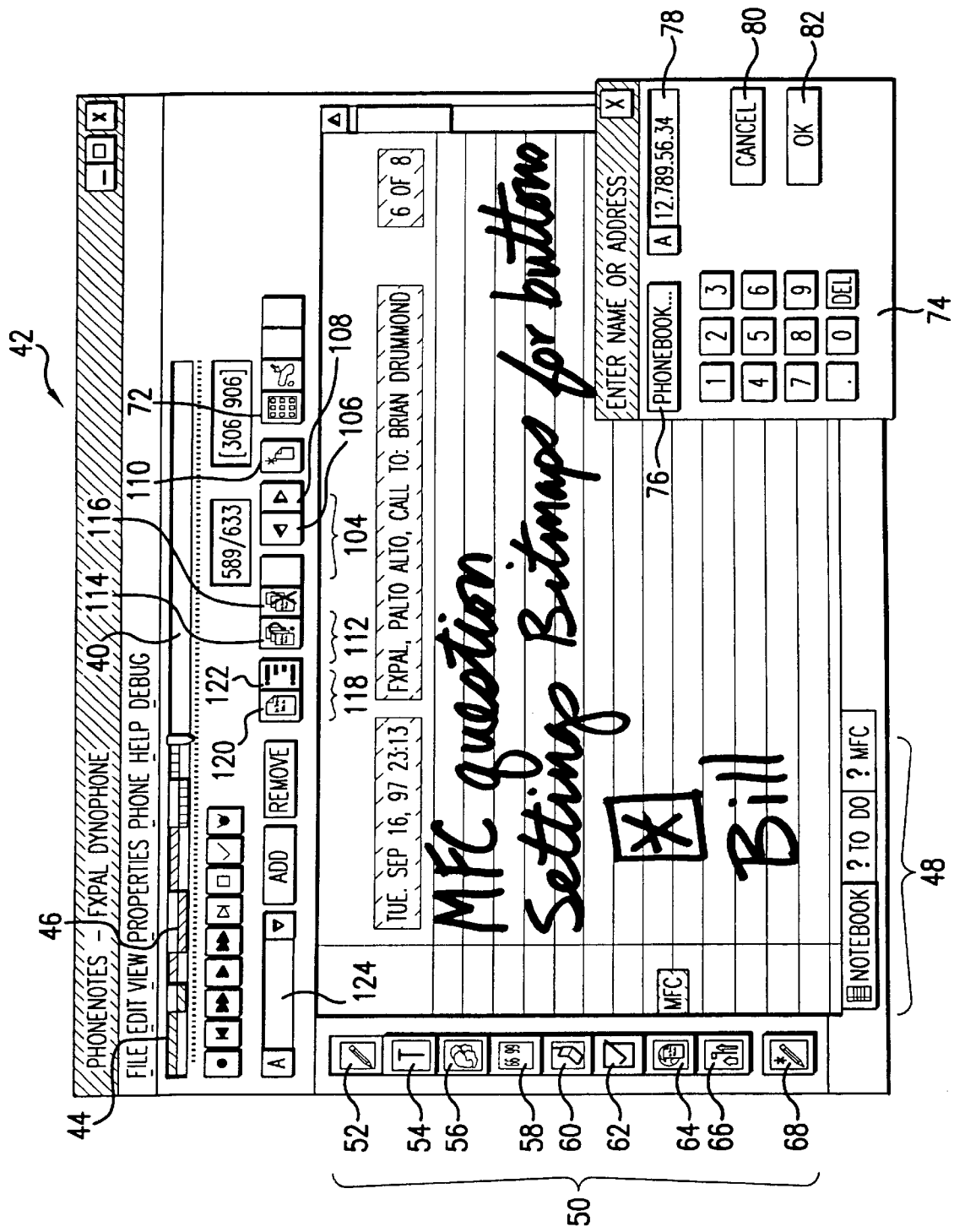
FIG. 3 illustrates a user interface of one embodiment of the audio data system according to this invention.

The user can also use the audio data system 10 of this invention to initiate calls using a database of phone numbers and callers, by specifying a person, either directly, by name, or indirectly, by referring to a note page associated with the person or to a recorded call from the person. FIG. 3 shows a call initiation dialog window 70 on top of user interface 42. A user can access the call initiation dialog window 70 by selecting the call initiation button 72 on the user interface 42. The call initiation dialog window 70 includes a keypad 74 that enables the user to manually enter a telephone number. The call initiation dialog window 70 also includes a phonebook button 76 which provides access to a phonebook listing of telephone numbers (not shown). The call initiation dialog window 70 also has a dropdown text entry box 78 which enables a user to place a cursor in the text entry box 78 and enter text and/or numbers using a separate data input device such as a keyboard. Lastly, the call initiation dialog window 70 has a cancel button 80 which enables a user to cancel a call initiation and also an "ok" button 82 which enables a user to initiate a call once the telephone number information has been entered.

This invention also provides a system for call screening and/or routing based on speaker identity. A screen mode (not shown) of the audio data system 10 can be set so that all calls are automatically answered, all calls are automatically recorded without interaction (as in voice mail), or calls are routed in accordance with the identity of the caller. In one embodiment of the screen mode, the audio data system 10 answers the call and sends a message to the caller to state his name and the purpose of the call. If the caller's identity matches a name on an "accept call" list, the user is notified of the call. Otherwise, the call is recorded as voice mail.

In addition to properties, the audio data system 10 of this invention allows keywords to be associated with audio data. This allows keyword-based retrieval of audio data. In contrast to properties, which describe the type of information contained in the audio data portions having those properties, keywords describe the actual content of the audio data. Because keywords reflect more general information, they are assigned to the entire audio data file and not to particular portions of audio data. Keywords are displayed in the margins of a digital page (not shown) and can be entered in several ways. For example, keywords can be selected from a list of previously entered keywords. Alternately, keywords can be typed in using a pop-up keyboard (not shown). Additionally, key words can be hand-written in a keyword entry box (not shown) and recognized using a standard handwriting recognition system. In the user-interface shown in FIG. 3, there is a drop down text entry box 124 for entering the keywords. Also, note marks can be selected and sent to a handwriting recognizer, and the resulting text entered as a keyword for the audio data associated with the note marks. If the user does not want to immediately interact with the handwriting recognition system, the user can associate the "keyword" property with digital ink to cause delayed recognition.

The audio data can be retrieved using attributes associated with the audio data such as caller, time, and topic, using properties and keywords. The user interface 42 also has query buttons 112 that enable a user to access a context-based query (not shown) by selecting the context-based query button 114 or access a query window 84 as shown in FIG. 4 using the query button 116. The query window 84 includes property check boxes 86 that enable a user to search based upon a designated property. The query window 84 also has a keyword entry box 88 that permits a user to search for audio data and notemarks having a specified keyword. Retrieval by keyword and name returns a list of audio data files with the identified caller and having the desired keyword. Retrieval by property is more specific, since it provides the audio data portions of calls and digital ink groups having the specified property. This is convenient for locating a particular comment in an audio data file. For example, if a comment is marked with the property "important", that audio data segment containing the comment can be retrieved using a query with the "important" property designated. Segments of audio data files can also be played to both parties during a conversation. Thus, comments from previous conversations can be shared.

Results from a search are shown in FIG. 5 in a search result window 94. The search result window lists the attributes of the retrieved data files in columns. The columns indicate the creation date 96, the date of last modification 98, the type of property as indicated by icon 100 and the keywords 102. The series of icons describe properties associated with the audio data files. For example, the telephone icon represents the property "phone number" and the check box represents the "action item" property. The final column displays keywords associated with the audio data files.

Using the indexing mechanisms provided by the digital properties, time stamping and keywords, the audio data system of this invention provides the user with multiple views of audio data stored in a notebook. The views provided by this invention are analogous to the views in a database system. If a query specifies a particular property, only those audio data portions having that property will be displayed. This view of the audio data is formed by newly generated audio data files, each having an original date and containing only the audio data portions with the specified property. The user can also create a view of a notebook by forming a query to request audio data files having specific keywords. The user can define the keywords in the query by browsing an alphabetized list of keywords that have been attached to pages, or by typing or writing the desired keywords.

As shown in FIG. 4, views are indicated by tabs 48 at the bottom of the notebook page. A name is associated with each tab 48 for easy reference. The user can return to the previous view by selecting the corresponding tab 48. The user can decide if the view should be static or dynamic. When the view is static, the contents of the view remains the same. When the view is dynamic, new items are added to the view as they are recorded by the notebook, provided that these items satisfy the terms of the query for this view.

A user can navigate through a notebook using the navigation buttons 104 in the user interface window 42. Navigation buttons 106 and 108 allow a user to page forward and backward through pages in a notebook. Navigation Button 110 is a new page button that starts data entry on a fresh notebook page.

The user interface 42 is also provided with- mode select buttons 118 which enable a user to select either a page mode using a page mode select button 120 or a table of contents mode using the table of contents mode select button 122. The user interface generally includes the features specified and described in co-pending U.S. patent application Ser. No. 08/821,311.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A digital audio recording system, comprising:
   an audio data input device;
   a processor in communication with the audio data input device responsive to the input of audio data to associate at least one property to a portion of the audio data, and at least one keyword to an entire audio data, so that the audio data may be searched and retrieved by one of selecting the at least one of the property and typing the at least one of the keyword into a query window such that the searching and retrieving are performed after said selecting or typing being entered, and that results in attributes of the retrieved audio data being displayed; and
   a storage device and communication with the processor for storing the audio data.

2. The system of claim 1, further comprising an audio data segmentation system that segments the audio data into at least two audio data segments and wherein the processor associates the at least one property to at least one of the audio segments.

3. The system of claim 2, wherein the audio segmentation system comprises a speaker segmentation algorithm.

4. The system of claim 1, further comprising a pen-based interactive display adapted to receive pen-based input, wherein the processor is responsive to the pen-based input to generate at least one mark comprising digital ink for display on the pen-based interactive display, wherein the digital ink comprises the at least one property and the storage device stores the digital ink.

5. The system of claim 1, wherein the audio data input device comprises a microphone.

6. The system of claim 1, further comprising a call screening device that processes the audio data based upon the property.

7. The system of claim 6, further comprising a database comprising at least one property that identifies at least one caller.

8. The system of claim 1, further comprising a display with an audio data timeline.

9. The system of claim 8, wherein the property is indicated to a user with a color on the display of the audio data timeline.

10. The system of claim 8, wherein the audio data timeline is divided into two audio data timelines each corresponding to a speaker in the audio data.

11. The system of claim 1, wherein the property is one of caller id, speaker id, time of recording, time of last modification, action item, name and keyword.

12. The system of claim 1, wherein the processor searches the storage device and retrieves the audio data associated with the selection.

13. The system of claim 1, wherein the audio data is an audio data file and the property is a keyword.

14. The system of claim 13, wherein the storage device stores a plurality of audio data files each having at least one keyword, wherein the processor is responsive to a user inputted query that identifies a keyword, searches the storage device and retrieves the audio data files having the identified keyword.

15. The system of claim 1, further comprising a user interface for designating the property.

16. The system of claim 15, wherein the user interface is a button that allows the user to selectively apply the property to the audio data.

17. The system of claim 1, wherein the audio data input device is adapted to receive audio data from a telephone system.

18. The system of claim 1, wherein the audio data input device is adapted to receive audio data from a network.

19. The system of claim 18, wherein the audio data input device is adapted to receive audio data from an intranet.

20. The system of claim 18, wherein the audio data input device is adapted to receive audio data from the Internet.

* * * * *